March 15, 1966  R. H. FOSTER  3,240,058
CONTINUOUS TENSION MONITOR FOR WEB-FEEDING MECHANISMS
Filed April 8, 1963

INVENTOR.
RAYMOND H. FOSTER
BY Kenway, Jenney + Hildreth
ATTORNEYS

United States Patent Office 3,240,058
Patented Mar. 15, 1966

3,240,058
CONTINUOUS TENSION MONITOR FOR WEB-FEEDING MECHANISMS
Raymond H. Foster, Norton, Mass., assignor to Mount Hope Machinery Company, Taunton, Mass., a corporation of Massachusetts
Filed Apr. 8, 1963, Ser. No. 271,230
5 Claims. (Cl. 73—144)

This invention relates to an improved continuous tension monitor for use with mechanisms such as are used for feeding continuous webs or strands, and finds particular utility in various commercial processes in which it is desired to detect the tension in a moving web, either for the purpose of measurement, or to establish a control signal for regulating tension control devices. The term "monitor" as used herein refers to means for detection of tension in a web for purposes of indication or control thereof, or both. The objects of the invention include the provision of an improved tension monitor which affords a continuous signal indicating the tension obtaining in a moving web; which is responsive as a continuous function of web tension; and which features a simplified construction combined with a high degree of accuracy. Further objects and advantages of the invention will appear as the following description proceeds.

Briefly stated, the invention contemplates the provision of a force-balancing valve unit, of which a movable valve member comprises a load-bearing plate against which a force proportional to the variable web tension is applied in a direction to close the valve orifice. The valve unit is formed with a variable fluid release orifice which is caused to vary in area by a movable load bearing plate, and the applied tension force is balanced by an air pressure supply to the orifice which reacts on the surface of the load bearing plate. The air pressure supply is regulated to apply sufficient pressure force to the load bearing plate to withhold the valve member from sealing to fully close the valve, under maximum tension conditions. The air volume flow rate is regulated by means of an adjustable restriction interposed in the supply conduit, such as a needle valve, to maintain a sufficient flow rate for maintaining a measurable range of pressure variation over the anticipated range of variation of area of the controlled orifice. The pressure obtaining in the conduit between the adjustable restriction and the variable fluid release orifice, is then a measure of the applied tension.

The variable fluid release orifice thus cooperates with the load bearing plate to perform two basic functions: first, the production of a tension-controlled pressure signal which may be used for indicating and/or controlling tension; and second, the establishment of a reaction force of regulable value, which balances the applied tension force.

A specific object of the invention is therefore the accomplishment, in a valve unit having a single variable orifice, of the functions of producing a force-balancing reaction force and establishing a force-indicating pressure signal, in which both the signal pressure and the reaction force are controlled by varying the orifice area as a function of the applied force.

The pressure signal may be applied to a suitable servo-loop which in turn controls conventional tension control devices, such as brakes or clutches applied to web reels or rolls.

The apparatus affords an accurate indication of web tension as a continuous function, by applying the air supply to balance the tension force, and thus regulate the escape of air through the fluid release orifice in such manner that the pressure in the supply conduit is a direct indication of the tension.

While the specification concludes with claims particularly pointing out the subject matter which I regard as my invention, it is believed that a clearer understanding may be gained from the following detailed description of preferred embodiments, referring to the accompanying drawing, in which:

Figure 1:
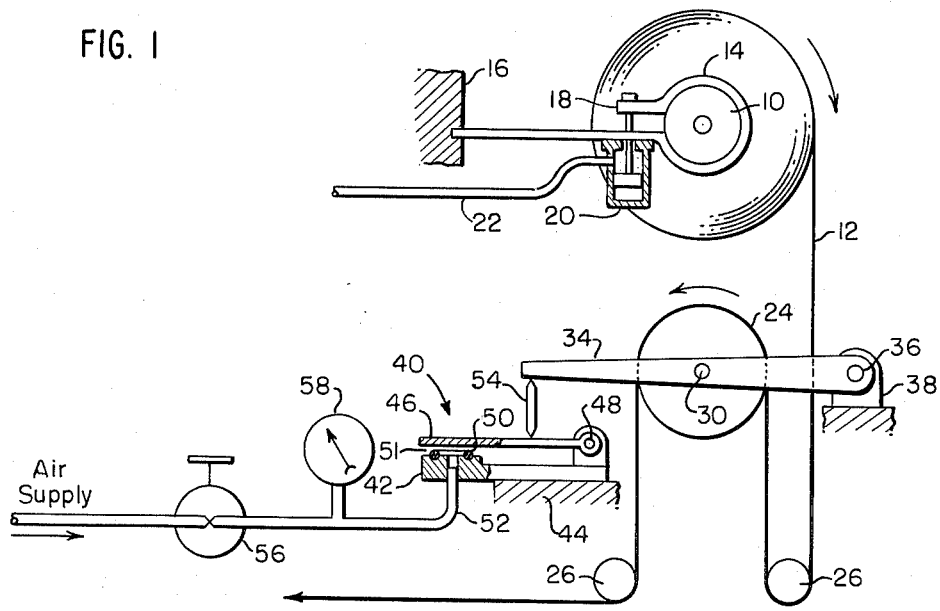
FIG. 1 is a schematic view showing a preferred embodiment of the monitor mechanism in operative relation to a portion of a web-feeding mechanism.
Figure 2:
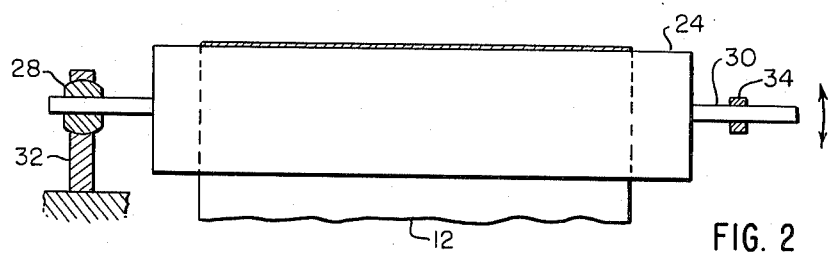
FIG. 2 is a view in elevation showing a tension-transmitting roll of FIG. 1.

Referring to FIGS. 1 and 2, the improved monitor is shown in operative relation to an illustrative web-feeding device, which includes a supply reel 10 carrying a roll of web or strand material 12 thereon, and journalled in suitable bearings (not shown) for feeding the web to a take-up reel or other device for drawing the web in the direction shown by the arrows. The supply reel 10 is conveniently provided with a brake 14 for exerting variable braking torque to regulate the web tension. Tension must be uniform in many processes, although the supply roll continuously diminishes in diameter, and thus the moment arm applied against the braking means also continuously decreases. The brake is illustrated as a split ring mounted in a stationary support 16, and having its free end 18 arranged for actuation by a fluid motor 20, connected for actuation by pressure supplied through a conduit 22.

To establish a force indicative of the tension obtaining in the web, a tension-transmitting roll 24 is wrapped by the web intermediate a pair of idler rolls 26, whose function is to provide adequate wrap about the roll 24 to transmit a component of web tension thereto. The roll is pivotally and rotatably mounted by means of a ball bushing 28 supporting one end of its axle 30 in a standard 32. The opposite end of the axle is pivotally and rotatably supported in a lever arm 34, which is pivotally mounted by a stub shaft 36 in a stationary support 38.

According to the invention, a force-balancing valve unit generally designated at 40 is organized on a base 42 which rests upon a stationary support 44. The unit includes a pivoted valve member or load-bearing plate 46, rotatably supported at 48 on the base plate, which cooperates with a resilient O-ring 50 to form a variable air-release orifice 51. A pressure supply conduit 52 terminates in the upper surface of the base plate interiorly of the O-ring 50, so that the relative position of the valve member 46 regulates the release of air through the valve.

The load is applied to the valve member by the arm 34, acting through a rod 54. The arrangement shown is such that the lever arms of the opposing air pressure force and tension force afford a mechanical advantage to the former; it will be understood that this affords convenience in design for specific applications, for adapting the device to the available air supply. It will be apparent that the force application by the air release is a function of the area of the orifice formed by the O-ring 50 and the load bearing plate 46.

Adjustable restriction means are interposed in the conduit 52, and in the preferred form comprise an adjustable needle valve 56. A pressure indicating gage 58 is placed in the conduit 52 intermediate the needle valve and the orifice 51, to indicate the tension in the web as a function of the air pressure obtaining in the conduit.

The needle valve 56 should be set to give an adequate range of pressure-variation response over the expected range of tension to be encountered in a run, so that for the available air supply, the valve member 46 will remain slightly open under the maximum expected tension loading. The needle valve 56 may be set while the web-feeding mechanism is stationary, to limit the maximum fluid flow through the valve to a rate sufficient to allow operation of the valve 40 over the desired tension range. The tension of the web may then be measured by any convential means, as well understood by those skilled in the art, and the pressure indicated by the gage 58 correlated with this tension measurement. During subsequent feeding operation, the indicated pressure in the conduit 52 will give an accurate indication of the actual tension of the web on a continuous basis, since this pressure is controlled by the balance between the air pressure reaction force on the load bearing plate 46 and the web tension transmitted by the roll 24. It will be understood that this pressure may also be used as a control signal for tension-control means, such as the illustrated brake 14 or other well-known devices; but such control systems form no part of the present invention.

Figure 3:
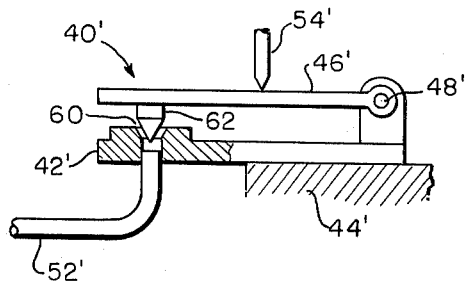
FIG. 3 is a schematic view showing a modified valve arrangement.

Referring to FIG. 3, a modified form of force-balancing valve is illustrated, parts similar to those of the preceding embodiment being similarly numbered, with prime superscripts. In this instance, the conduit 52' terminates in a conical orifice 60, cooperating with a needle valve body 62 mounted on the member 46'. Other forms of pressure release valves may be utilized, such as are adapted only to apply a pressure force against the valve member to balance the tension load, in such manner as to modulate the air pressure in the supply conduit as a continuous function of the applied tension.

While I have illustrated and described preferred embodiments of the invention by way of illustration, it will be understood by those skilled in the art that various changes and modifications may be made without departing from the true spirit and scope of the invention, which I therefore intend to define in the appended claims without limitation to the details of the foregoing embodiments.

What I claim is:

1. A continuous tension monitor for use with web-feeding mechanisms, comprising: a single-force-balancing valve unit forming a single variable fluid-release orifice for balancing an applied force and for controlling a force-indicating pressure in response to the applied force, said valve unit including a base having a single valve member movably mounted thereon and a fixed orifice formed in said base and valved by said member to form said fluid-release orifice therebetween; means constructed and arranged for operative engagement with a web fed by said mechanism for applying a force, proportionate to the tension obtaining in said web to said valve member in a direction tending to close said valve unit; said fixed orifice being arranged for delivering pressure fluid against said valve member to develop a pressure force opposing the closing of said valve member by said applied force; conduit means connected with said fixed orifice; fluid supply means for delivering fluid to said conduit under pressure at least sufficient to balance said force and thereby retain said valve unit open; and means forming a continuously-open restriction interposed in said conduit to limit the rate of supply of fluid to said fixed orifice for maintaining the valve unit open to an extent which is an inverse function of the applied tension force, whereby the pressure in said conduit intermediate said restriction means and said fluid-release orifice is a continuous function and indication of the tension of the web.

2. A continuous tension monitor as recited in claim 1, together with means for indicating the pressure in said conduit intermediate said restriction means and said fluid-release orifice to indicate the tension of the web.

3. A continuous tension monitor as recited in claim 1, in which said valve member comprises a load-bearing plate pivotally mounted on said valve unit for application of the applied load to said plate with a moment arm whose length is adjustable with respect to that of the pressure force applied through said fluid-release orifice.

4. A continuous tension monitor as recited in claim 1, in which said fluid-release orifice is formed by an opening in said valve unit and a resilient element extending peripherally thereabout for seating upon said valve member in a closed position of the valve unit.

5. A continuous tension monitor for use with a web-feeding mechanism, comprising: a single valve unit including a base and a single valve member movably mounted thereon, a single fluid-release orifice formed in said base and valved by said member; a movable roll supported by said valve member and arranged to be wrapped by the web for transmitting a force proportionate to the tension of said web to said valve member in a direction tending to close said valve unit; said fluid-release orifice being arranged for delivering pressure fluid against said valve member to develop a pressure force opposing the closing of said valve member by said applied force; conduit means connected with said fluid-release orifice; fluid supply means for delivering fluid to said conduit under pressure at least sufficient to balance said tension force and thereby retain said valve unit open; means forming an adjustable restriction in said conduit to limit the rate of supply of fluid to said fluid-release orifice for maintaining the valve unit open to an extent which is an inverse function of the applied tension force, and means for indicating the pressure in said conduit intermediate said adjustable orifice means and said fluid-release orifice to indicate the tension of the web.

References Cited by the Examiner

UNITED STATES PATENTS

| 2,343,181 | 2/1944 | Heinz | 73—388 |
| 2,455,285 | 11/1948 | Versaw | 73—88 |
| 2,557,185 | 6/1951 | Gibbs | 242—75.43 |
| 2,621,511 | 12/1952 | Van Dorn | 73—37.5 |
| 2,755,032 | 7/1956 | Justus | 242—75.43 |
| 2,885,889 | 5/1959 | Trimmer. | |
| 2,914,076 | 11/1959 | Zimmerli | 73—388 |
| 2,954,221 | 9/1960 | Ernst. | |
| 3,149,489 | 9/1964 | Schmaeng | 73—144 |

RICHARD C. QUEISSER, *Primary Examiner.*

JOSEPH P. STRIZAK, *Examiner.*